United States Patent [19]

McComas et al.

[11] Patent Number: 4,705,203

[45] Date of Patent: Nov. 10, 1987

[54] REPAIR OF SURFACE DEFECTS IN SUPERALLOY ARTICLES

[75] Inventors: Charles C. McComas, Stuart; Dennis C. Stewart, Palm City, both of Fla.

[73] Assignee: United Technologies Corporation, Hartford, Conn.

[21] Appl. No.: 892,688

[22] Filed: Aug. 4, 1986

[51] Int. Cl.[4] .............................. B23P 6/04; B23P 1/04
[52] U.S. Cl. .................................................. 228/119
[58] Field of Search ....................... 228/119; 219/76.16

[56] References Cited

U.S. PATENT DOCUMENTS

| 3,947,606 | 3/1976 | Rohr et al. | 219/76.16 |
| 4,008,844 | 2/1977 | Duvall et al. | 228/119 |
| 4,078,977 | 3/1978 | Fountain | 228/119 |
| 4,233,490 | 11/1980 | Shalai et al. | 219/76.16 |
| 4,285,459 | 8/1981 | Baladjanian et al. | 228/119 |
| 4,382,169 | 5/1983 | Rabkin et al. | 219/76.16 |
| 4,442,968 | 4/1984 | McMurray et al. | 228/119 |
| 4,459,062 | 7/1984 | Siebert | 219/76.16 |
| 4,493,451 | 1/1985 | Clark et al. | 228/119 |

Primary Examiner—M. Jordan
Attorney, Agent, or Firm—Charles E. Sohl

[57] ABSTRACT

Methods of repairing defects in superalloy articles are described. Defective areas are cleaned and prepared to expose clean substrate surfaces. A layer of superalloy powder material containing a melt depressant (boron) is applied. A layer of superalloy material essentially free from boron is then applied. The dual coated article is heated to a temperature at which the boron containing layer melts, but the boron-free layer does not. The boron diffuses into the substrate raising the melting point of the molten material until solidification results. The unmelted surface layer is subsequently removed leaving behind a repaired article free from surface defects.

2 Claims, 6 Drawing Figures

REPAIR OF SURFACE DEFECTS IN SUPERALLOY ARTICLES

TECHNICAL FIELD

This invention relates to the repair of surface defects in superalloy articles.

BACKGROUND ART

Superalloy articles such as blades and vanes are extensively used in gas turbine engines. Such articles have high mechanical properties and are resistant to oxidation and corrosion. Despite these good properties the severe operating environment which these parts operate can cause surface degradation in the form of cracks, areas of surface erosion, and the like. These components are expensive to produce and there is a need for repair processes to restore used articles to their original condition. Also, in the manufacturing process, defects occasionally occur and there is a similar need and desire to repair manufacturing defects.

Attempts have been made to weld repair these articles by applying filler material using electric arc welding. This approach has been generally unsuccessful because of cracking and because some superalloy compositions cannot be produced in wire or rod form.

It has also been proposed to cut away the defective areas and to braze in replacement sections having appropriate contours. This has not been found to be practical because of the wide variation in the size and shape of defects. Also, the trend in modern superalloy articles is toward thin wall castings having internal cooling passages. Use of a braze insert repair process with thin wall castings is inappropriate because of the likelihood that these thin walls will be completely cut through in the repair process.

Another repair process is described in U.S. Pat. No. 4,008,844 which is assigned to the present assignee and which is incorporated herein by reference. According to this patent a mixture of metal powders is made of two powders of different compositions. One composition approximates that of the superalloy to be repaired while the other composition also approximates the composition of the superalloy to be repaired, but contains a melting point depressant, usually boron. The defect to be repaired is filled with a mixture of these powders and then heated to a temperature at which the boron containing powder melts, but the boron-free powder and the substrate, does not melt. Solidification then occurs isothermally over a prolonged period of time as the boron diffuses into the substrate thereby raising the melting temperature. This is a successful process but has limitations in that it is difficult to apply exactly the right amount of material to a shallow surface defect and because when large defects are to be filled the molten material tends to flow out of the defect during the heat treatment process.

Accordingly, it is an object of the present invention to describe a surface flaw repair process applicable to superalloy components.

It is another object to describe a surface defect repair process which is particularly suited for repairing large shallow defects and for building up worn surfaces on superalloy components.

Yet another object of the present invention is to describe a surface defect repair process in which the previously encountered difficulties with the flow of molten filler materials are eliminated.

DISCLOSURE OF INVENTION

According to the invention surface defects, especially large shallow surface defects, are repaired by plasma spraying two layers over and into the surface defect and heat treating the sprayed article to cause melting of the first layer while the outer layer does not melt and acts to restrain the molten material and isolate it in the defect area during solidification.

According to the present invention the defective article is first processed by conventional techniques to clean the defect area of contamination to provide a clean, high integrity substrate metal surface in the defect area.

Next, a superalloy powder approximating the substrate composition but containing boron is plasma sprayed onto the cleaned surface in the defect area. Plasma spraying is continued until the defect is slightly overfilled. Then, a layer of superalloy material essentially free from boron is plasma sprayed over the first plasma sprayed layer. The plasma spray conditions for the second layer are chosen to produce a porosity-free, high integrity surface layer which encapsulates the melt depressant containing layer. The two layer sprayed article is then heat treated at temperature at which the boron containing layer melts but a temperature not high enough to cause melting of the substrate or the outer layer. Solidification occurs isothermally because the boron diffuses into and is diluted by the substrate thereby raising the melting point of the melted material. During the solidification process the outer layer locates and restrains the molten material, isolating it in the area of the defect. After solidification has occurred the outer plasma sprayed layer is essentially removed using conventional mechanical techniques leaving behind a defect-free repaired area.

The foregoing, and other features and advantages of the present invention will become more apparent from the following description and accompanying drawings.

BEST MODE FOR CARRYING OUT THE INVENTION

Figure 1:
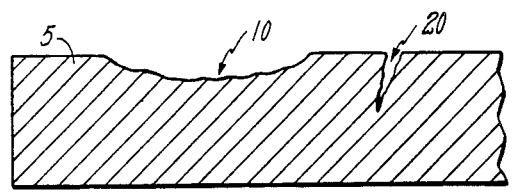
FIG. 1 shows a substrate which contains surface defects.

The best mode will be described with reference to the accompanying Figures and to the Example. FIG. 1 illustrates two typical surface defects, a shallow worn or eroded area 10 and a crack 20. These defects may have occurred in manufacturing or during service.

Figure 2:
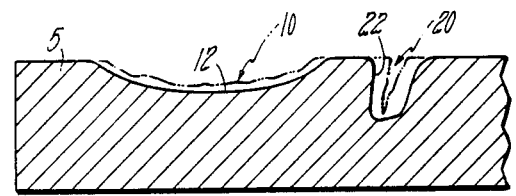
FIG. 2 shows the FIG. 1 substrate after defect cleanup.

The first step in the repair process is to clean the substrate in the defect area to remove surface contamination which would otherwise interfere with the repair. This may be accomplished in a variety of ways which are all more or less conventional. In the case of a manufacturing defect the surface will generally be rather clean and the surface may be prepared using an abrasive grit blast and/or an etching solution to expose bare substrate metal. As depicted in FIG. 2 a shallow surface 10 defect produced by severe service may be grit blasted to expose the substrate while a deeper crack 20 may be machined away to expose the substrate 22.

Then a layer 15 of superalloy material containing a melt depressant (boron) is applied to the cleaned area. This material is applied by a thermal spraying process. Preferably this is a plasma spraying process although similar processes such as flame spraying and the detonation gun technique may also be employed. The spraying is preferably performed in a reduced pressure chamber and/or under an inert atmosphere to minimize oxidation during spraying. The sprayed material is a superalloy particulate, which will be described in more detail below but, which is similar in composition to the superalloy substrate with additions of 1% to 4% of boron. This amount of boron depresses the melting point of the superalloy material by from about 100° F. to about 450° F. The spraying process is used to apply a dense layer of this material and to build up the surface of the flawed area to at least an approximation of the original surface contour, preferably some excess is applied since the applied deposit will be less than 100% dense. Then, a second layer 25 is sprayed over the first layer comprising a superalloy material which will usually be similar in composition to the substrate, but without the melting point depressant and which therefore has a melting point approximating that of the substrate. The thickness of the outer layer should be at least about 0.005 in. to provide the necessary properties and thicker layers can be used to provide a sink for boron diffusion, 0.010 is a typical thickness.

Figure 3:
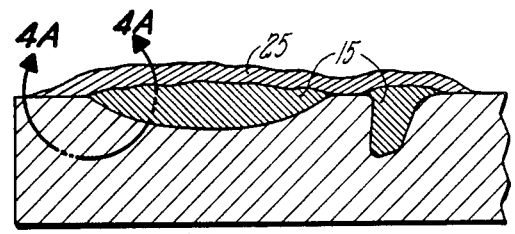
FIG. 3 shows the FIG. 2 substrate plasma spraying of filler material and restraint material.
Figure 4A:
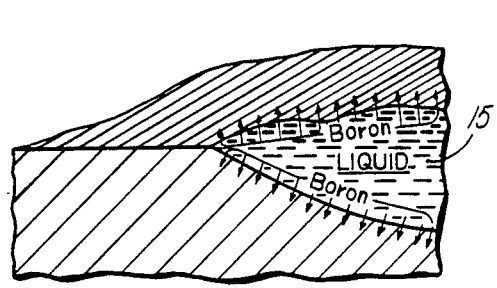
FIG. 4A shows the FIG. 3 filled substrate during solidification.
Figure 4B:
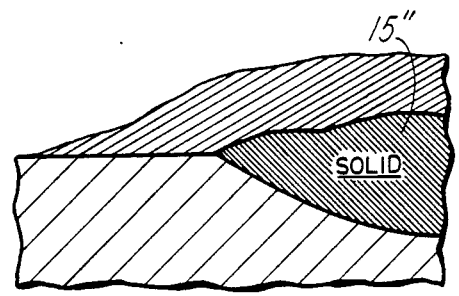
FIG. 4B shows the FIG. 3 filled substrate after solidification.

At this point the appearance of the defect area is as shown in FIG. 3 which shows first layer 15 and second layer 25. Because of the melt depressant in the first layer, the article can be heated to a temperature where layer 15 melts (forming molten material 15' in FIG. 4A) but substrate 5 and layer 25 do not (e.g. from 100° F. to 450° F. below the substrate solidus depending upon boron content). When the first layer 15 melts it fills the defect with molten material 15' while the unmelted outer layer restrains the molten material 15', confining it to the area of the defect. Solidification then occurs isothermally as the boron diffuses away from the molten material producing the result shown in FIG. 4B wherein the solidified material is denoted as 15".

Isothermal solidification is desirable because it minimizes warpage and shrinkage which might occur with more rapid cooling. Also, because the isothermal solidification temperature exceeds the service temperature, isothermal solidification insures that no melting will occur during initial service. The term isothermal is not to be rigidly construed and it encompasses both processes in which minor decreases in temperature occur during the heat treatment (to speed solidification) and processes in which minor increases in temperature occur during the process (to speed boron diffusion).

Figure 5:
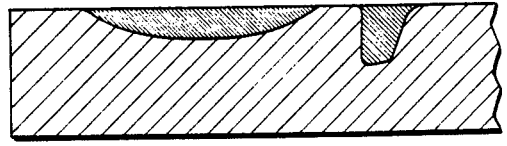
FIG. 5 shows the repaired article after machining.

After isothermal solidification has occurred the unmelted outer layer which contains some residual porosity typical of plasma sprayed deposits is removed by conventional (mechanical) techniques which can also shape the surface of the repaired article to substantially the original surface contour. The result shown in FIG. 5 is a repaired article with an appropriate surface contour which is free from flaws and voids.

Another advantage of isothermal solidification is that this solidification process encourages epitaxial growth in which the crystal structure of the substrate extends into the repaired area so that, after solidification, there is no discernable boundary between the original substrate and the repaired area. This is an important advantage of the process which makes it suited for the repair of single crystal articles in which the presence of extraneous grain boundaries would be unacceptable.

Certain alternatives and variations will now be mentioned. One of these is the use of a mixture of powders for the first layer wherein one powder contains the boron melt depressant while the second powder species is free from boron. Upon exposure of such a mixture at an appropriate temperature a semiliquid slushy material will result. The ratio of the powders, the boron content in the one powder species, and the processing temperature can be varied to change the properties of this slushy material from fluid to viscous. This approach can aid in controlling the flow of the first layer and would also be useful in the situation where a very large amount of repair material was required since the boron-free powder species provides a sink for boron to diffuse into thereby increasing the rate of solidification over that which would be observed if all of the boron were required to diffuse into the substrate. This approach is similar in some respects to the teachings of U.S. Pat. No. 4,008,844.

It has previously been indicated that the composition of the first sprayed layer approximates that of the substrate being repaired (except for boron). This will generally be the case, however, it is clear that some variance in composition is permissible and may in fact be useful in certain conditions. For example where the defect has arisen because of oxidation, the oxidation resistance of the repair material can be increased by increasing the aluminum content of the first layer material relative to that of the substrate, and by adding other elements known to those skilled in the art to improve oxidation resistance including tantalum and yttrium. If the surface defect has arisen as a result of localized corrosion it may be appropriate to increase the chromium content. Those skilled in the art will readily be able to make such composition modifications as necessary to suit the particular circumstances at hand. The composition of the outer sprayed layer which does not melt, will also usually be similar to the substrate. However, because the outer layer is removed in the later steps of the process, a large amount of compositional flexibility is possible so long as the melting point of the outer layer is not significantly depressed relative to the substrate. It should also be mentioned that the outer layer may contain the small (0.005% typical) amounts of boron which are conventionally present in superalloys.

The present invention may be better understood through reference to the following illustrative example.

EXAMPLE

It was desired to repair a surface defect in an IN100 superalloy turbine blade having a nominal composition of 15.0 Co - 9.0 Cr - 5.5 Al - 5.0 Ti -3.0 Mo - 1.0 V - 0.2 C - Ni Bal. This surface defect consisted of a shallow eroded area in the leading edge with a depth of 0.030–0.040 inches relative to the original surface contour. A −180 mesh (U.S. sieve) powder was prepared (nominal composition having the same composition as the IN100 substrate except for the addition of 3.5% boron. Whereas IN100 has an approximate liquidus temperature of 2430° F., the addition of 3.5% boron reduced the liquidus temperature about 400° F. Powder of the composition was plasma sprayed in a chamber maintained at 100 Torr pressure to produce a 95% dense deposit in the area of the flaw which extends upwards somewhat above the original surface contour. Over this first deposited layer a second deposited layer of IN100 powder was plasma sprayed to a thickness of 0.010 inch. The resultant article was heat treated at a temperature of about 2000° F. for about 16 hours and it was found that the first layer had melted and then isothermally solidified. The article was then abrasively machined to restore the original contour. During this abrasive machining process, the outer plasma sprayed layer was entirely removed and the isothermally solidified fully dense repaired area was exposed. Following this repair process the original coating was restored and the part was found to be fully equivalent to a new part.

Although this invention has been shown and described with respect to detailed embodiments thereof, it will be understood by those skilled in the art that various changes in form and detail thereof may be made without departing from the spirit and scope of the claimed invention.

We claim:

1. Method of repairing surface defects in superalloy articles including the steps of
   a. preparing the article substrate surface by removing contamination,
   b. plasma spraying a first material into the defect area to fill the defect, said first material having a composition similar to that of the substrate being repaired except that from 1-4% boron has been added to depress the melting point,
   c. plasma spraying a layer of a second material over the first material, said second material having a melting point which approximates or exceeds that of the substrate,
   d. heating the article to a temperature which melts said first material without melting said substrate or said second material and holding at that temperature until isothermal solidification occurs,
   e. removing at least said second material.

2. Method of repairing surface defects in superalloy articles including the steps of
   a. preparing the article substrate surface by removing contamination,
   b. plasma spraying a first material into the defect area to fill the defect, said first material comprising a mixture of two species of powders, one of said powder species containing 1-4% boron and the overall composition of the two powder species being similar to that of the area being repaired except for boron content,
   c. plasma spraying a layer of a second material over the first material, said second material having a melting point which aproximates or exceeds that of the substrate,
   d. heating the article to a temperature which melts said first material without melting said substrate or said second material and holding at that temperature until isothermal solidification occurs,
   e. removing at least said second material.

* * * * *